(12) United States Patent
Damodaran et al.

(10) Patent No.: US 10,169,816 B2
(45) Date of Patent: Jan. 1, 2019

(54) TRADING ANOMALY KILL SWITCH

(71) Applicant: MORGAN STANLEY, New York, NY (US)

(72) Inventors: Aditya Damodaran, Short Hills, NJ (US); Richard Huddleston, New York, NY (US); Joseph Edward Pendergast, Jr., Brookhaven, NY (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 417 days.

(21) Appl. No.: 14/590,201

(22) Filed: Jan. 6, 2015

(65) Prior Publication Data

US 2016/0196606 A1 Jul. 7, 2016

(51) Int. Cl.
*G06Q 40/00* (2012.01)
*G06Q 40/04* (2012.01)
*G06Q 40/06* (2012.01)

(52) U.S. Cl.
CPC ............. *G06Q 40/04* (2013.01); *G06Q 40/06* (2013.01); *G06Q 40/00* (2013.01)

(58) Field of Classification Search
CPC ........... G06F 12/14; G06F 9/44; G06Q 40/00; G06Q 40/04; G06Q 40/06; H04L 12/26
USPC .................... 705/36 R, 37; 717/124; 726/23; 709/224
See application file for complete search history.

(56) References Cited

U.S. PATENT DOCUMENTS

| | | | |
|---|---|---|---|
| 7,680,718 B2 * | 3/2010 | Brandes | G06Q 10/04 705/36 R |
| 7,870,062 B2 | 1/2011 | Waelbroeck et al. | |
| 8,606,685 B2 | 12/2013 | Keiser et al. | |
| 9,282,109 B1 * | 3/2016 | Aziz | G06F 21/554 |
| 9,607,337 B2 | 3/2017 | Amicangioli | |
| 2003/0225672 A1 | 12/2003 | Hughes, Jr. et al. | |
| 2007/0143198 A1 * | 6/2007 | Brandes | G06Q 10/04 705/36 R |
| 2008/0025229 A1 | 1/2008 | Beliles et al. | |
| 2009/0048985 A1 | 2/2009 | Kuhnle et al. | |
| 2009/0216674 A1 * | 8/2009 | Nunes | G06Q 40/04 705/37 |
| 2010/0100500 A1 * | 4/2010 | Nunes | G06Q 40/04 705/36 R |

(Continued)

FOREIGN PATENT DOCUMENTS

WO 2012136627 A1 10/2012

OTHER PUBLICATIONS

Mukherjee, A., Bhattacharjee, P., Mukherjee, D., & Misra, P. (2012). Data stream management system and capital market surveillance. International Journal of Computer Theory and Engineering, 4(3), 410. doi:http://dx.doi.org/10.7763/IJCTE.2012.V4.494 on Aug. 10, 2018 (Year: 2012).*

(Continued)

*Primary Examiner* — Kito R Robinson
(74) *Attorney, Agent, or Firm* — Weitzman Law Offices, LLC (57) ABSTRACT

A system that can detect when abnormal trading activity is occurring and take action to halt the detected abnormal trading activity without human intervention using a computer-implemented anomaly detection and action stage that performs an exponential weighted averaging of trade order flow, on a per symbol basis within a sliding volume based window and a volume based exponential weighted averaging, on a per symbol basis, on trade update messages received during the sliding volume based window and checks for an inflection in covariance between them. A related method is also described.

20 Claims, 7 Drawing Sheets

(56) References Cited

U.S. PATENT DOCUMENTS

| | | | |
|---|---|---|---|
| 2010/0145874 A1 | 6/2010 | Janowski | |
| 2010/0174666 A1* | 7/2010 | Brandes | G06Q 10/04 705/36 R |
| 2012/0143741 A1 | 6/2012 | Lopez de Prado et al. | |
| 2012/0278477 A1* | 11/2012 | Terrell | H04L 41/5009 709/224 |
| 2012/0284158 A1* | 11/2012 | Kovac | G06Q 40/06 705/37 |
| 2013/0179320 A1* | 7/2013 | May | G06Q 40/04 705/37 |
| 2014/0006610 A1 | 1/2014 | Formby et al. | |
| 2014/0180964 A1 | 6/2014 | Han | |
| 2014/0188765 A1 | 7/2014 | Forsythe | |
| 2014/0372278 A1 | 12/2014 | Mortimer et al. | |
| 2015/0088726 A1* | 3/2015 | Aisen | H04L 67/325 705/37 |
| 2015/0106251 A1* | 4/2015 | Farnstrom | G06Q 40/04 705/37 |

OTHER PUBLICATIONS

Lee, V. C. S., & Yang, X. (2005). Development and test of an artificial-immune-abnormal-trading-detection system for financial markets Retrieved from https://dialog.proquest.com/professional/docview/833488511?accountid=142257 on Aug. 10, 2018 (Year: 2005).*

Strike Technologies LLC, "Strike Risk" (2013).

FTEN, "FTEN Trde Control Gateways" (2012).

Mantara Inc., "Mantara Product Sheet: ExpressWay E-Brake" (2012).

Simena, "Packet Flow Switch—PFS1524" (2011).

NPulse Technologies LLC, "HammerHead Capture & Replay Specification" (2011).

Anonymous: "Network tap—Wikipedia, the Free Encyclopedia". Permanently archived at URL: http://en.wikipedia.org/wiki/index/php?title=Network_tap&oldid=580838157.

* cited by examiner

TRADING ANOMALY KILL SWITCH

FIELD OF THE INVENTION

This disclosure relates generally to electronic trading platforms and, more particularly, to detection and handling of system-based trading anomalies that can occur on an electronic trading platform.

BACKGROUND

The advent of computerized trading (interchangeably known as electronic trading) and low latency and other algorithmic trading rely upon sophisticated computer programs to handle large volumes of orders to one or more exchanges in times far too short for humans to accomplish, follow or directly manage. At these speeds, there is significant risk that a programming fault can cause a significant volume of trades to occur before any human could recognize a problem exists and rectify it thereby increasing the risk to the trading entity and of an adverse affect on the market as a whole.

This can easily be illustrated in a simplified example, involving a single stock. Assume that an entity initiates an order (buy or sell) of 1000 shares of XYZ stock. With current trading platforms that order can be handled in several ways. It may be routed to a single market for execution as a block or, using "order slicing" it can be broken up into smaller "slices" (for example: (1) 10 orders of 100 shares each, (2) one order of 500 shares, one order of 200 shares and 3 orders of 100 shares each, two orders of 500 shares, (3) five orders of 200 shares, etc.) to either a single market or two or more different markets, at the same time or on staggered timing, for execution. In some cases, the order may even be broken down into multiple "odd lots" (i.e. lots of less than 100 shares), which do not appear in the publicly available "consolidated data" reporting.

However, a problem can arise if some component of the routing software, or a hardware problem, causes that order (or some part thereof) to improperly, repeatedly issue in rapid-fire fashion. In such a case, what was intended as a single order of 1000 shares of XYZ could, in an instant, become a series of orders for many, many more shares than intended, likely quickly and erroneously affecting the price of XYZ stock.

While the erroneous multiplication of a single order a few times may not result in a significant loss or market disruption, it can easily be seen that issue may be dramatically magnified in a matter of seconds if the problem affects multiple stocks and/or markets, and can cause significant disruptions to not only the involved stocks, but also have a cascading effect on related options and indices, and in some cases, the markets themselves.

This is a very real problem because it is not unusual for order flow to result in more than thousands or even tens of thousands of trades per second on any one of multiple exchanges, far quicker than any human could comprehend let alone promptly react to if a problem arose. For example, as reported in a Knight Capital Group, Inc. ("Knight Capital") press release, in August 2012, Knight Capital experienced a technology issue in its automated trading system's trading software that resulted in Knight sending numerous erroneous securities orders into the market. When finally recognized, the erroneous orders had to be traded out of, and consequently caused a loss of over $400 million.

BRIEF SUMMARY

One aspect of this disclosure involves a system that can detect when abnormal trading activity on any of multiple exchanges is occurring and take action to halt the detected abnormal trading activity without human intervention. The system is made up of multiple network taps, a first of the multiple network taps being on an exchange side of an order flow element and the second network tap being on a side of the order flow element opposite the exchange side, the order flow element being in a path over which trade orders travel to exchanges, the first and second network taps each being configured to tap trade order message flow along the path passing through the order flow element toward at least one of the multiple exchanges, the first and second network taps each being used to capture a copy of the trade order message flow for analysis. The system also includes a computer-implemented anomaly detection and action stage having a first interface through which real time market transactional data can be received, a second interface through which the copy of the trade order message flow can be received via at least the first and second network taps, and programming, stored in the non-transient program storage that implements an anomaly detection engine, the programming that implements the anomaly detection engine being configured to receive trade order flow information from the first and second network taps and analyze the received trade order information relative to market information by i) performing an exponential weighted averaging of trade order flow, on a per symbol basis within a sliding volume based window, directed from the trading system to all exchanges to which trades of that symbol can be directed by the trading system while accounting for order cancellations, order replacements, order rejections and order slicing, ii) performing a volume based exponential weighted averaging, on a per symbol basis, on trade update messages received during the sliding volume based window, iii) on a per symbol basis, checking for covariance between the exponential weighted average of the trade order flow and the exponential weighted average of the trade update messages, and iv) comparing trade order messages passing into the order flow element with the trade order messages passing out of the order flow element for consistency in quantity and value. If the anomaly detection engine detects either a) anomalous trade order message flow for at least one symbol through the order flow element, or b) an inflection point in the covariance indicating a market deviation, for the at least one symbol, that either increases, or persists for, a specified duration of time, then the anomaly detection engine will, according to a hierarchical protocol, automatically take a specified action to stop ongoing anomalous trading of the at least one symbol.

Another aspect involves a trading system having multiple network taps coupled to trade flow paths within the trading system so as to capture trade order messages directed to at least one exchange of multiple exchanges for execution without adding latency to the trade order messages. The trading system also has multiple order flow elements each having at least one of the multiple network taps on either side thereof. The trading system additionally has an anomaly detection and action stage coupled to the multiple network taps and configured to receive and analyze, on a per symbol basis, trade order information directed within the trading system towards the multiple exchanges based upon covariance between at least an exponential volume weighted average within sliding volume based windows for the trade order information relative to market trading as reported by the multiple exchanges and determine whether an inflection point in the covariance exists for any symbol and, when an inflection point exists for a symbol, determine whether either the covariance deviation rate or covariance deviation duration indicates anomalous trading activity and, if anomalous trading activity is indicated, trigger an automatic action to halt the anomalous trading activity while minimizing disruption of trading for other symbols by the trading system.

Yet another aspect involves a method of automatically detecting anomalous trading activity, directed within a trading system to at least one exchange. The method involves receiving trade order information directed to exchanges for particular symbols at a computerized anomaly detection and action stage, receiving trade update information from the exchanges at the computerized anomaly detection and action stage, using the computerized anomaly detection and action stage, analyzing, on an exponential volume weighted average basis within a sliding volume-based window, for each of the particular symbols, covariance between the trade order information and the trade update information in order to identify whether an inflection in the covariance exists for at least one symbol that is indicative of anomalous trading in that symbol, and when an inflection in the covariance exists, triggering a protocol that will halt the anomalous trading of that symbol.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

We have devised a system and method that allows for the automated real time monitoring and analysis of electronic, low latency and other algorithmic trading activity to determine whether anomalous trading activity is occurring and intervene in a minimally disruptive manner as possible or appropriate to isolate and halt the ongoing order routing to end the anomalous trading. With our approach we can minimize both risk and the impact on proper trading activity while reducing the prospect of "false positives" (i.e. erroneous flagging of proper activity as anomalous).

At this point, it should be noted that the term "unit" is used herein to denote what is being traded, irrespective of whether the product making up the unit are shares of stock, bonds, option (e.g. put or call) contracts, commodity and/or futures contracts, derivatives, swaps, other types of financial instruments, etc. In other words, the term "unit" is intended to encompass any type of financial instrument that is priced and traded, for example, via: (a) any electronic exchange with which the particular system deals, as well as, in some implementations, (b) internal fills, and/or (c) dark pool trading. As used herein, the term "exchange" is intended to encompass any or all of: traditional trading exchanges, electronic exchanges, internal trade matching (i.e. "fill") systems, and dark pool trading configurations. Representative, non-limiting examples of traditional and electronic trading exchanges include the Chicago Stock Exchange, NASDAQ, the CBOE Stock Exchange, the National Stock Exchange, NQBX, the PXS Stock Exchange (NQPX), the New York Stock Exchange (NYSE), the EDGA and EDGX exchanges, the Archipelago Exchange (ARCA), the BATS exchanges, the London Stock Exchange, the ICE Futures Exchange, Euronext, Chicago Futures Exchange, etc.

As used herein, the term "trade order" is intended to encompass, at any given instant, trades, orders or both.

Similarly, as used herein, the term "symbol" is used to denote an identifier of one or more units that is directly or indirectly used by an exchange and order system to effect the buying or selling of associated units. For example, with stocks, a symbol would be the company's stock ticker symbol, for bonds, a symbol could be the stock CUSIP number, for options, a symbol would be the options symbol or other indicator of the company, strike price and expiration date, likewise for commodities and futures contracts, a symbol would be the indicator of the particular thing being traded and delivery date.

Finally, as used herein, the terms "order flow element" and "OFE" are interchangeably used as a way to denote one or more the components that make up the order flow path from the point the order can be entered to the gateway to the exchange(s) where the order (or constituent parts) will be placed. Note that, depending upon the particular system, an individual OFE can defined such that it corresponds to a single hardware component or it can be defined so as to incorporate multiple hardware components in the order flow path.

In general, our approach "taps into" or "observes" (without disrupting) the order flow to and from the exchange(s) at various points in the order flow and analyzes that order flow at multiple parts of the overall order entry relative to market-provided information to automatically identify potentially erroneous trading activity and stop it in, ideally, the most minimally disruptive manner as soon as possible. Specifically, the approach taps the order flow on both sides of one or more OFEs such that the total quantity of units for a symbol that constitute an order (or part thereof) entering an OFE must be the same when exiting the OFE.

As described in detail below, our approach uses an "entropy" approach to detecting erroneous trading activity detection that takes into account trading volume and value preservation and/or looks for order flow activity that varies suspiciously away from the market as a whole (i.e. deviates when activity for one or more symbols across all relevant exchanges are considered in aggregate) within a specified sliding volume window. If such a deviation is found, with our approach, the system can act in a "circuit breaker" fashion and, if a hardware or software component is at fault in an overall manner, halt that particular component, or if there is a fault affecting one or more symbols or exchanges, it can (as appropriate) halt the operation on: (1) a single symbol/single exchange basis, (2) multiple symbol/single exchange basis, (3) a single symbol/multiple exchange basis, and (4) multiple symbol/multiple exchange basis.

Moreover, and advantageously, our approach does not require components situated within the order flow path. As a result, our system and method does not add latency (i.e. increase the time for order-related information to pass between the trade desk and an exchange or vice-versa).

With the foregoing in mind, our approach will now be described with reference to the figures in which the same reference number in the different views denotes the same thing.

Figure 1:
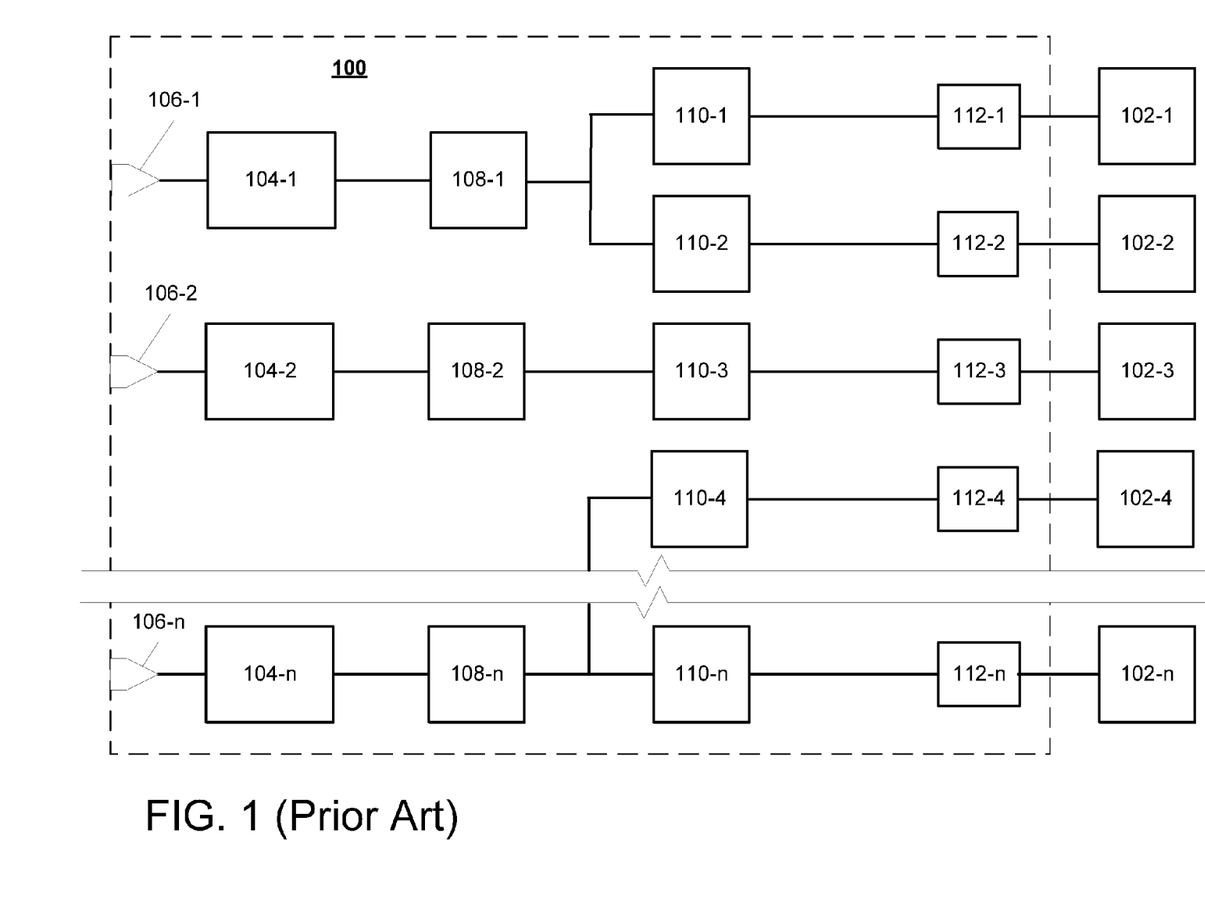
FIG. 1 illustrates, in simplified form, an overview of a portion of a prior art trading system that enables trade order flow to/from different exchanges.

In overview, our approach is implemented in a conventional order flow system made up of conventional and known order entry hardware components and devices which collectively allow an order for purchase or sale (i.e. trade) of units to be sent to, and trade confirmation received from, one or more exchanges whether according to manual orders entered by a trader, automated trading strategies or some combination thereof. FIG. 1 illustrates, in simplified overview form, an example of one such conventional order flow system 100 coupled to multiple exchanges 102-1, 102-2, 102-3, 102-4, . . . , 102-n to which the order flow system can route orders for execution, for example, one or more of a traditional exchange, electronic exchange, internal fill systems (for internal trade matching), and/or dark pool(s).

As shown, the system is made up of multiple "smart" order entry components 104-1, 104-2, . . . , 104-n. The smart order entry components 104-1, 104-2, . . . , 104-n receive entered orders for the purchase or sale of units as a result of, for example an order entered by a trader, broker or even a programmed trading computer via a conventional interface 106-1, 106-2, . . . , 106-n appropriate for the particular devices.

Those "smart" order entry components 104-1, 104-2, . . . , 104-n route orders to one or more of the exchanges 102-1, 102-2, 102-3, 102-4, . . . , 102-n, via switches 108-1, 108-2, . . . , 108-n that provide the orders to conventional order routers 110-1, 110-2, 110-3, 110-4, . . . , 110-n which, in turn, send all or some portion of any particular order to a specific exchange 102-1, 102-2, 102-3, 102-4, . . . , 102-n for execution via other or additional switch/interfaces 112-1, 112-2, 112-3, 112-4, . . . , 112-n.

The smart order entry components 104-1, 104-2, . . . , 104-n and order routers 110-1, 110-2, 110-3, 110-4, . . . , 110-n are themselves made up of programmed computers or are programmed computer controlled, as are the switches 108-1, 108-2, . . . , 108-n and switch/interfaces 112-1, 112-2, 112-3, 112-4, . . . , 112-n.

At this point it should be noted that the various connections between the various components shown in FIG. 1 may include one or more of wired, wireless or optical fiber connections as appropriate or desired.

As noted above, with such systems, although rare, it is possible for something to go awry with one of those devices or their programming, potentially resulting in, for example, the improper, repeated issuance of duplicate orders in rapid-fire fashion as noted above that could result in significant market disruption and/or loss.

As noted above, we have devised an approach that uses a "braking" system integrated into the order flow system 100 to monitor order and trade flow to and from exchanges that detects, in real time, liability accrual for orders directed to the exchanges across the entire system and checks them against trade update messages received back from the exchanges. This provides a "per exchange" view of trading activity and aggregate trading activity for all units being traded to detect whether an issue has occurred or is occurring, where the fault is occurring and take the (ideally) least disruptive action to stop it from continuing.

Figure 2:
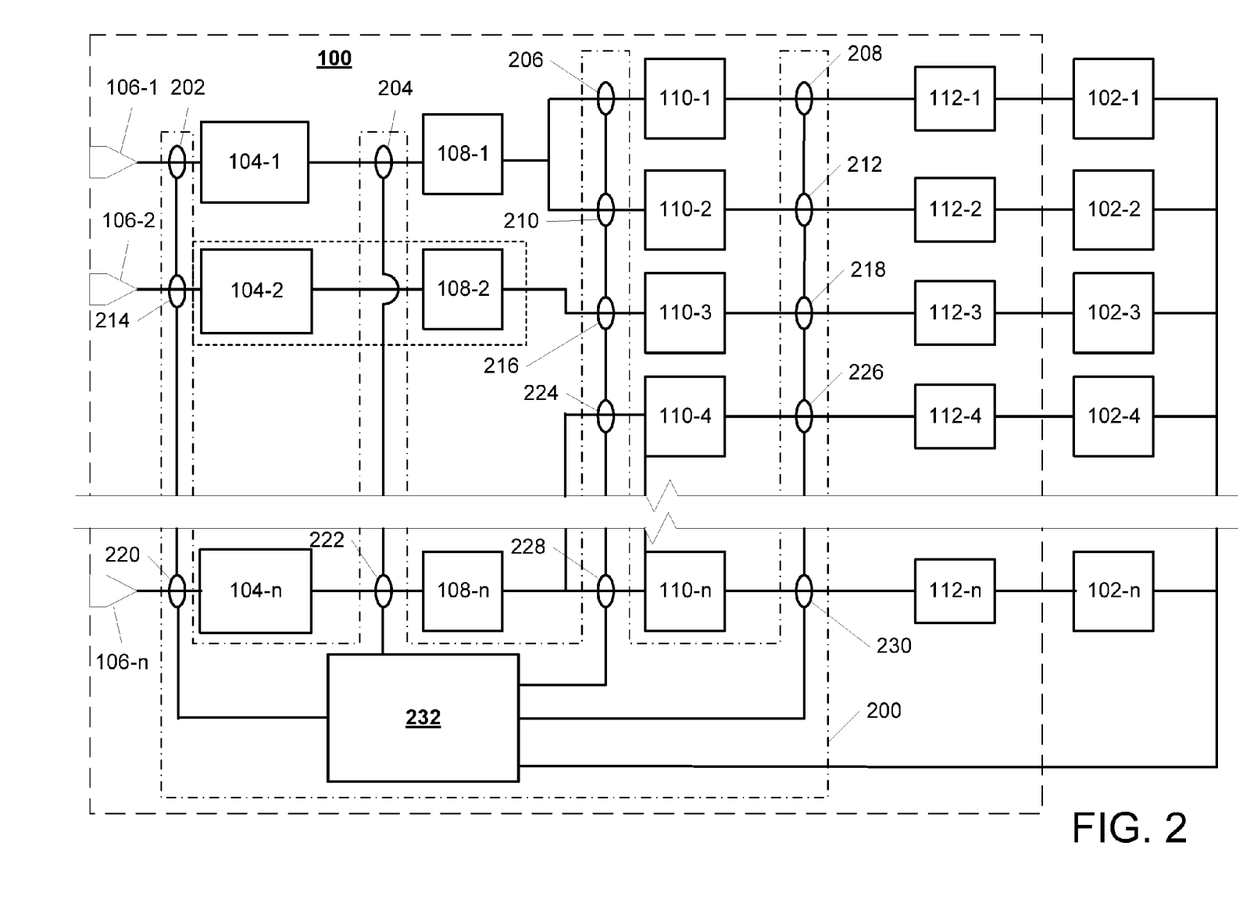
FIG. 2 illustrates, in simplified form, the system of FIG. 1 into which our "braking" system has been deployed.

FIG. 2 illustrates, in simplified form, the system 100 of FIG. 1 into which our "braking" system has been deployed. The system 100 of FIG. 2 is similar to that of FIG. 1 except that, to the extent they were not previously used, it includes optical fiber interconnections between the smart order entry components 104-1, 104-2, . . . , 104-n, the switches 108-1, 108-2, . . . , 108-n, the switch/interfaces 112-1, 112-2, 112-3, 112-4, . . . , 112-n and the order routers 110-1, 110-2, 110-3, 110-4, . . . , 110-n to accommodate a series of optical taps 202, 204, 206, 208, 210, 212, 214, 216, 218, 220, 222, 224, 226, 228, 230 that, collectively with an analytical engine 232 (which will be described later in greater detail), form the braking system 200 (denoted by the alternating dot-dashed line).

As shown in FIG. 2, all of the order routers 110-1, 110-2, 110-3, 110-4, . . . , 110-n, as well as two illustrated smart order entry components 104-1 and 104-n, and two switches 108-1, 108-n, are all OFEs because they have a tap on either side of them. In contrast, the combination of smart order entry component 104-2 and switch 108-2 are collectively one OFE 236 because they are both between two taps 214, 216 and there is no tap between them.

In addition, in FIG. 2, there are no taps between the switch/interfaces 112-1, 112-2, 112-3, 112-4, . . . , 112-n and the exchanges 102-1, 102-2, 102-3, 102-4, . . . , 102-n. This is merely for purposes of illustrating that the specific tap placement is a matter of design choice and which components are to be OFEs. As such, it should be understood that fewer or more taps could have been used in FIG. 2, as well as in any other specific implementation(s).

Figure 3:
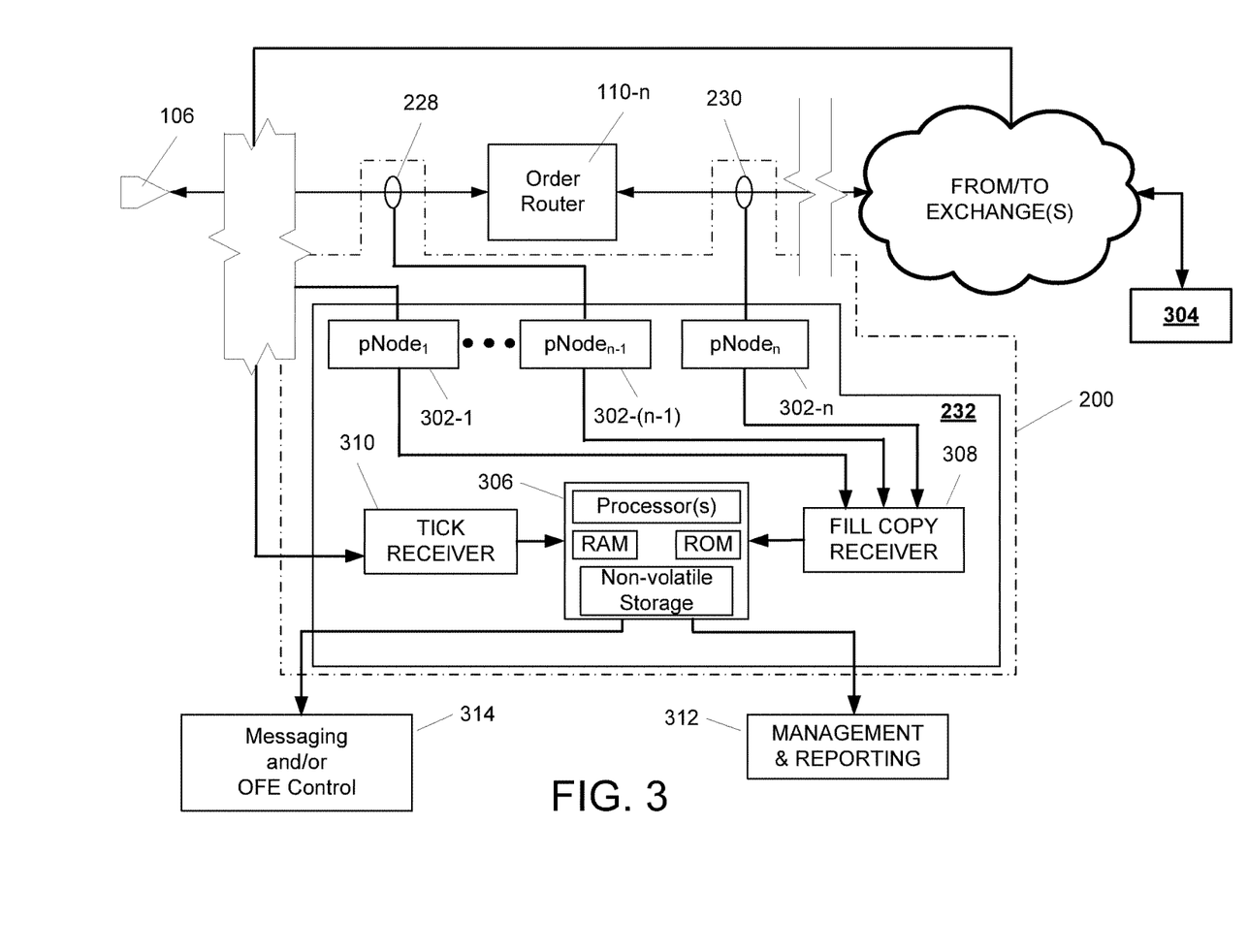
FIG. 3 illustrates, in simplified form, the functional components of one example implementation of the braking system 200.

Having described the overall configuration of a system employing our approach, further details of the braking system 200 will now be described in connection with FIG. 3 which illustrates, in simplified form, the functional components of one example implementation of the braking system 200. As shown in FIG. 3, the braking system 200 is made up of the taps (only two of which 228, 230 are shown) coupled with a series of elements called "pNodes" (pNode$_1$ through pNode$_n$). 302-1, . . . , 302-n–1, 302-n which operate to tap into and capture trading information being sent to the exchanges 304 (one or more of exchanges 102-1, 102-2, 102-3, 102-4, . . . , 102-n) in this case, the taps 228, 230 are on either side of an Order Router 110-n and, consequently, that Order Router 110-n is an OFE. Physically, in one example implementation, the pNodes and taps are made using the nPulse Hammerhead commercially available from nPulse Technologies, 375 Four Leaf Lane, Suite 204, Charlottesville, Va. 22903 and Simena nGenius PFS-1520 packet flow monitoring switch and taps commercially available from NetScout Systems, 310 Littleton Road, Westford, Mass. 01886-4105. Thus, it should be recognized and understood that each pNode is itself a special purpose computer containing at least on processor, RAM, ROM, programming such as firmware and software contained in non-volatile storage, external interfaces, etc. Depending upon the particular implementation, with that hardware, those devices may be (1) paired on a one-to-one basis, or (2) configured with two or more PFS-1520s per nPulse Hammerhead. Of course it should be recognized that other alternative hardware from those companies or others may be used to equal effect, the important aspect being the ability to tap into the order flow without adding latency to that flow and provide that order flow data for analysis by one or more functional component(s) called the Anomaly Detection & Action Stage 306. In addition, it should be understood that the physical placement of the pNodes relative to the actual "tap" locations is not to be implied by the FIG. 3 representation. Depending upon the particular implementation, the pNode may be physically remote from the physical tap location or it can be in close proximity thereto.

As further shown in the example implementation representation of FIG. 3, the pNodes 302-1, . . . , 302-n–1, 302-n send the tapped order information (or some subset thereof) to the Anomaly Detection & Action Stage 306 optionally via a Fill Copy Receiver 308. Since the tapped order information could be coming from different exchanges 304 and have different formats, the Fill Copy Receiver 308 is used to parse and reformat the order information it receives into a common form usable by the Anomaly Detection & Action Stage 306 in its analysis. In addition or alternatively, the Fill Copy Receiver 308 may add additional information to the information provided, such as an identification of the tap from which the information was obtained and any other information that may be needed by the Anomaly Detection & Action Stage 306 or may be desirable for the Anomaly Detection & Action Stage 306 to have, for example the TCP/IP 5-tuples that uniquely identify the OFEs or some part thereof.

In addition, the Anomaly Detection & Action Stage 306 receives a feed of trade update messages directly from the relevant exchanges 304 which is also fed to the Anomaly Detection & Action Stage 306 via the "Tick" Receiver 310. Like the Fill Copy Receiver 308, the Tick Receiver 310 parses and reformats the trade update information it receives into a common form usable by the Anomaly Detection & Action Stage 306 and may optionally also add additional information as may be needed by Anomaly Detection & Action Stage 306. Note here, that, depending upon the particular implementation, for speed and efficiency, the Anomaly Detection & Action Stage 306 could be made up of one or more computers so that, for instance, the analysis necessary for anomaly detection could be split up among the various computers in a convenient way. For example, the split could be by types of units being traded (i.e. split equities, from options, from bonds, from commodities, from options, etc.) and could be further split into sub-sets based upon, for example, range(s) of symbols. Likewise, the functions performed by the Fill Copy Receiver 308 and/or Tick Receiver 310 could alternatively be performed in the same device, different devices or in the Anomaly Detection & Action Stage 306 itself and could internally be split up based upon the particular manipulations that need to be performed on the information before passing it to the Anomaly Detection & Action Stage 306.

The Anomaly Detection & Action Stage 306 is a computer device containing conventional computer components such as one or more processors, RAM, ROM, non-transient program storage, data storage, appropriate programming, interfaces, keyboard(s), display(s) etc., and is configured to use the information it receives directly, or via the optional Fill Copy Receiver 308 and optional Tick Receiver 310, to, under program control, determine whether anomalous trading activity exists, and if it does, the OFE to which anomalous trading is attributable, and, in such cases, to take appropriate action to stop (or cause to stop) such anomalous trading activity. Depending upon the particular implementation, in order to take action, the Anomaly Detection & Action Stage 306 can further be configured with an interface that allows the Anomaly Detection & Action Stage 306 to directly control or shut down one or more of the OFEs or it can be configured to send an appropriate message to a Messaging or OFE Control 314 part of the order flow system 100 to tell it to take a particular action with respect to one or more OFEs (or components making up such OFE(s)). More details about the approach used by the Anomaly Detection & Action Stage 306 to do this is described below.

In general, in some further implementations, upon detecting anomalous trading activity (and optionally periodically or upon request), the Anomaly Detection & Action Stage 306 is further configured to provide information to one or more Management & Reporting Computers 312. In general, the Management & Reporting Computers 312 are conventional computers configured with software enabling a user to view appropriate reports containing the information supplied by the Anomaly Detection & Action Stage 306 and may also allow the user to configure the Anomaly Detection & Action Stage 306 or modify one or more parameters used by the Anomaly Detection & Action Stage 306 to detect an issue.

Having described example component arrangements for our approach, more detail regarding the operation of the pNodes and Anomaly Detection & Action Stage 306 will now be described.

In general overview, as mentioned above, the pNodes tap into and obtain a copy of the orders and trades flowing into and out of each OFE and provide that information to the Anomaly Detection & Action Stage 306. The Anomaly Detection & Action Stage 306 aggregates the received information from all pNodes such that all orders to all exchanges can be accounted for, irrespective of splitting of orders to different exchanges or partial order fills. In this way, the Anomaly Detection & Action Stage 306 will have both a per exchange view of trading and an aggregate of trading across all exchanges as well as a record from the exchange side of all consummated trades. Using this information, and in contrast to existing anomalous trade identification approaches, we use an entropy measurement approach to identifying anomalous trading through volume-based checking of covariance relative to the market.

Figure 4:
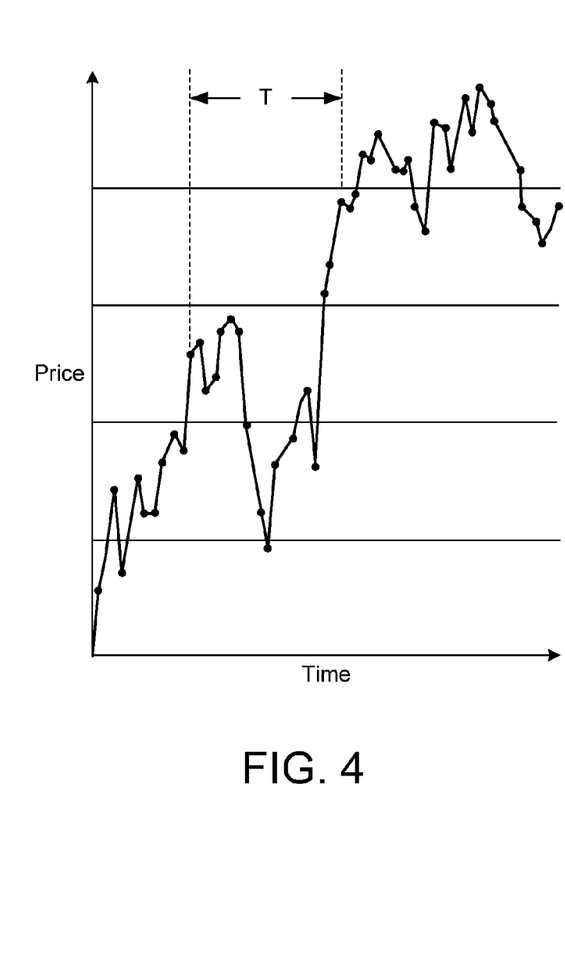
FIG. 4, which illustrates in simplified form, a price vs. time chart for market trading of a particular symbol.
Figure 5:
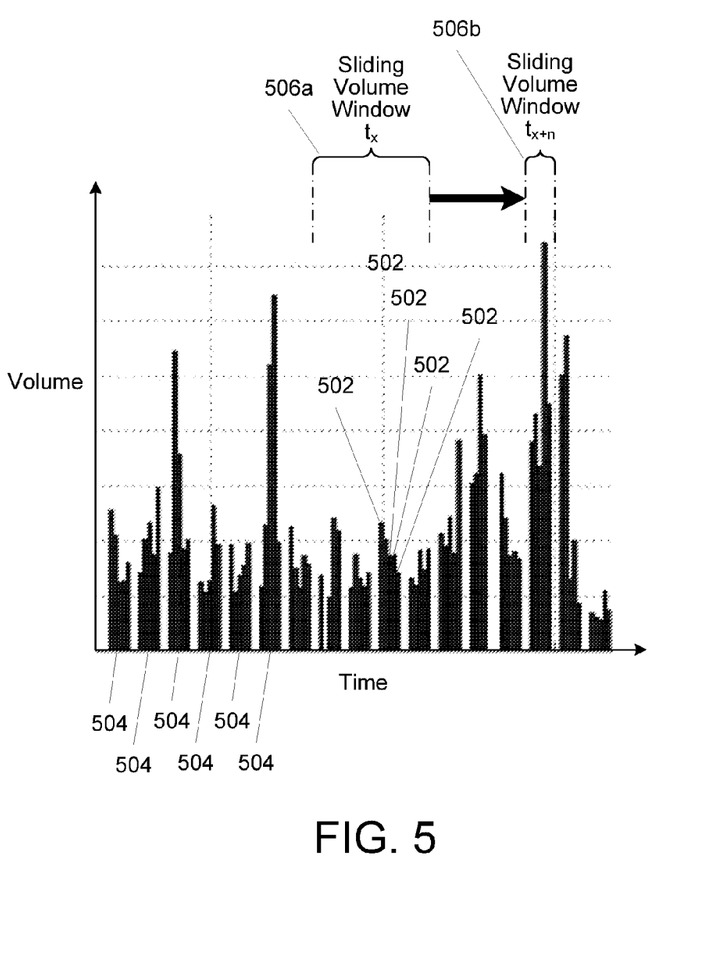
FIG. 5 illustrates in simplified form, a volume vs. time chart for some of the different markets on which the system is trading the symbol of FIG. 4.

Our anomaly detection approach as applied by the Anomaly Detection & Action Stage 306 will now be described by way of example with reference to FIG. 4, which illustrates in simplified form, a price vs. time chart for market trading of a particular symbol, with the dots representing instances of trades. FIG. 5 illustrates in simplified form, a volume vs. time chart for some of the different markets on which the system is trading the symbol of FIG. 4 during time period "T" of FIG. 4. As shown in FIG. 4, over time, the price of this particular symbol is changing significantly. Similarly, as shown in FIG. 5, each stick 502 in a group 504 represents the volume of that symbol traded in a specific exchange at a particular point in time during time "T", with the aggregate volume of the group 504 representing the market volume for that symbol at that point in time. Thus, in the example of FIG. 5, there are 5 markets in which that symbol is traded during that particular period of time and the differences in their volumes reflects differences in orders, order routing and/or order splitting. As further shown in FIG. 5, because it is volume based, the sliding volumetric window changes in size from one width 506a (when volumes are lower) at time $t_x$ to a narrower width (when volumes are higher) 506b at time $t_{x+_n}$.

With our approach, on a symbol basis, the following analysis is performed by the Anomaly Detection & Action Stage 306. First, for the trading system of interest, the historical percentage of the market volume that system makes up is periodically determined. Depending upon the particular system 100 and amount of trading, the period can be longer or shorter and may differ based upon the particular symbol and market(s) involved. By way of example, using a moving average, if a particular symbol trades about 18.5 million units per day on the market of interest and, historically, the particular system 100, on average accounts for 10.8% of that volume, then that means that the particular system typically accounts for about 2 million units of that symbol's trades per day.

Based upon that analysis, a volumetric moving window size is established. Using the above example of 2 million units per day, a volumetric window of 100,000 units may be established. Then, using the volume information contained in the trade update information received from the market and the information obtained from the system 100 via the taps, using the sliding volumetric window, two moving averages are calculated on a per symbol basis, one for the market and the other for the system's portion of that trading while accounting for order cancellations, order replacements, order rejections and order slicing within the system. The results of these moving average calculations is then used for anomaly detection by an anomaly detection engine, which is specific programming operating within the Anomaly Detection & Action Stage 306 that implements a volume-based weighted average analysis of trade information to ascertain whether anomalous trading may exist.

An anomaly is detected when a serious divergence rate and/or sustained discrepancy exists between the system 100 and the market under the assumption that, over a reasonably expectable time period, a normal divergence from the market can occur but will quickly regress back towards the norm, whereas an anomaly will not. Notably, this approach allows for the normal trade-burst activity that can occur in normal circumstances, for example due to a news announcement related to the symbol, while avoiding erroneously detecting it as an actionable anomaly.

Specifically, the anomaly detection process is done using the anomaly detection engine by, within each sliding volume-based window, taking an exponential weighted average for both the market trading volume in the symbol and the system 100 trading volume in the symbol. Under normal conditions, the covariance between the two will be positive, meaning the two will essentially linearly track each other. In contrast, a potential anomaly will exist when, on the sliding volume-based window basis, there is an inflection point (i.e. change in covariance from positive to negative) between the system trading volume and the market volume. Upon recognition of an inflection point, a linear weighted moving average for both the system 100 and the market is analyzed, as the window is going forward, to determine the degree of deviation and its persistence (i.e. the trend). Depending upon the particular implementation, the linear weighted moving average of the trade volume for each symbol can be calculated continuously and/or concurrently with the exponential weighted average calculations or it can be initiated upon recognition of an inflection point for a particular symbol.

Figure 6A:
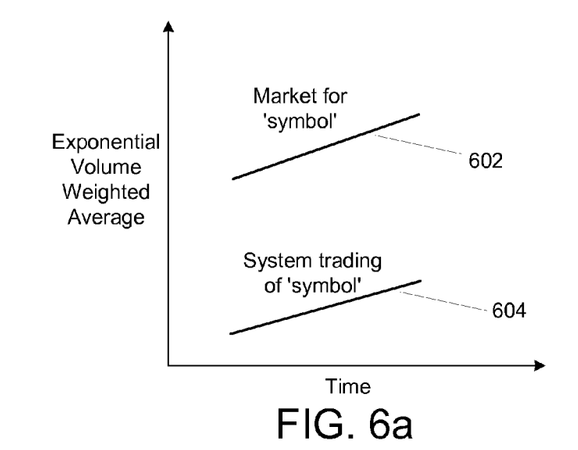
FIGS. 6*a* through 6*c* illustrate, in simplified form, three example graphs of normal and inflection situations.
Figure 6B:
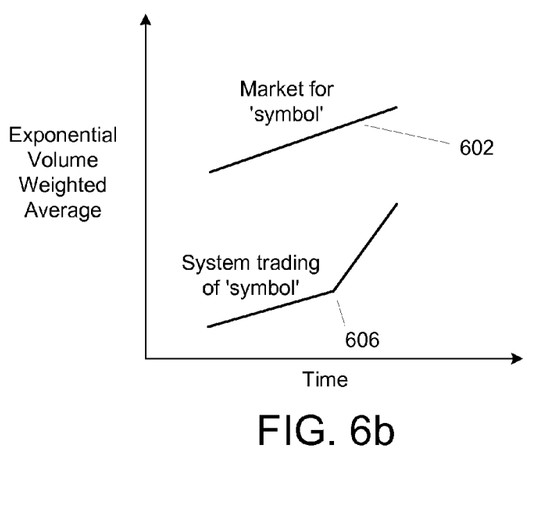
Figure 6C:
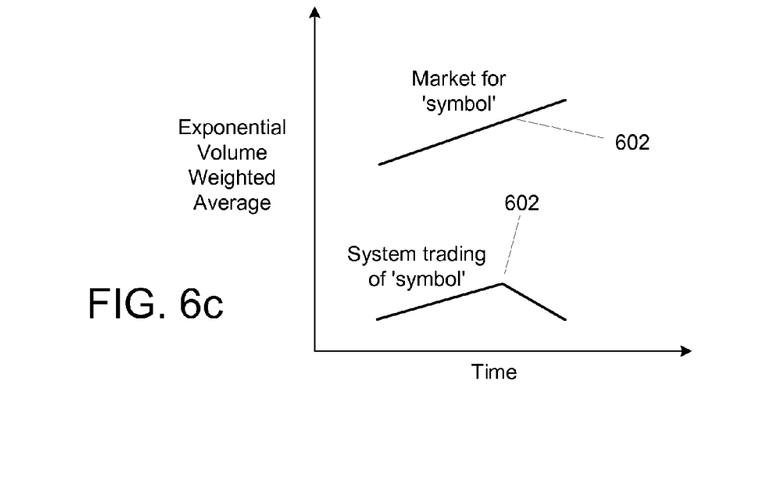

FIGS. 6a through 6c illustrate, in simplified form, three example graphs of normal and inflection situations. In particular, FIG. 6a shows a normal situation in which the upper line 602 shows the exponential volume weighted average for the market trading of a symbol over time and the lower line 604 shows the exponential volume weighted average for the trading of that symbol by the system 100 as obtained via the taps. As can be seen in FIG. 6a, the two lines are essentially parallel, reflecting a positive covariance between the two. In contrast, FIG. 6b shows an example anomalous situation occurring during the same period reflected in FIG. 6a, as indicated by the inflection point 606 (change in slope) in the exponential volume weighted average reflecting anomalous increasing trading volume for that symbol by the system 100 relative to the market trading 602 that persists for some time. Similar to FIG. 6b, FIG. 6c shows an alternative example anomalous situation occurring during the same period reflected in FIG. 6a, also indicated by an inflection point 608 in the exponential volume weighted average, in this case reflecting anomalous decreasing trading volume for that symbol by the system 100 relative to the market trading 602 persisting for some time. As should be understood, the situation reflected in FIG. 6c would be less disruptive, and could be more reflective of a legitimate situation than that of FIG. 6b. That is because FIG. 6c could reflect liquidation of a particular symbol following adverse news such that, following liquidation, that symbol will thereafter be sparsely traded in the system 100, if at all, while it continues to be traded by others in the market as a whole.

Up to this point, we have described our approach to anomaly detection relative to the market. We will now describe a further level of anomaly detection that allows one to detect a problem with one or more particular symbols attributable to a particular OFE for a particular exchange.

As noted above, an OFE is defined as the particular components that the system's order flow passes through that are between two taps. In other words, one tap is on the exchange-facing side of the OFE and the other is on a side of the OFE opposite the exchange side (i.e. the OFE input side).

Figure 7:
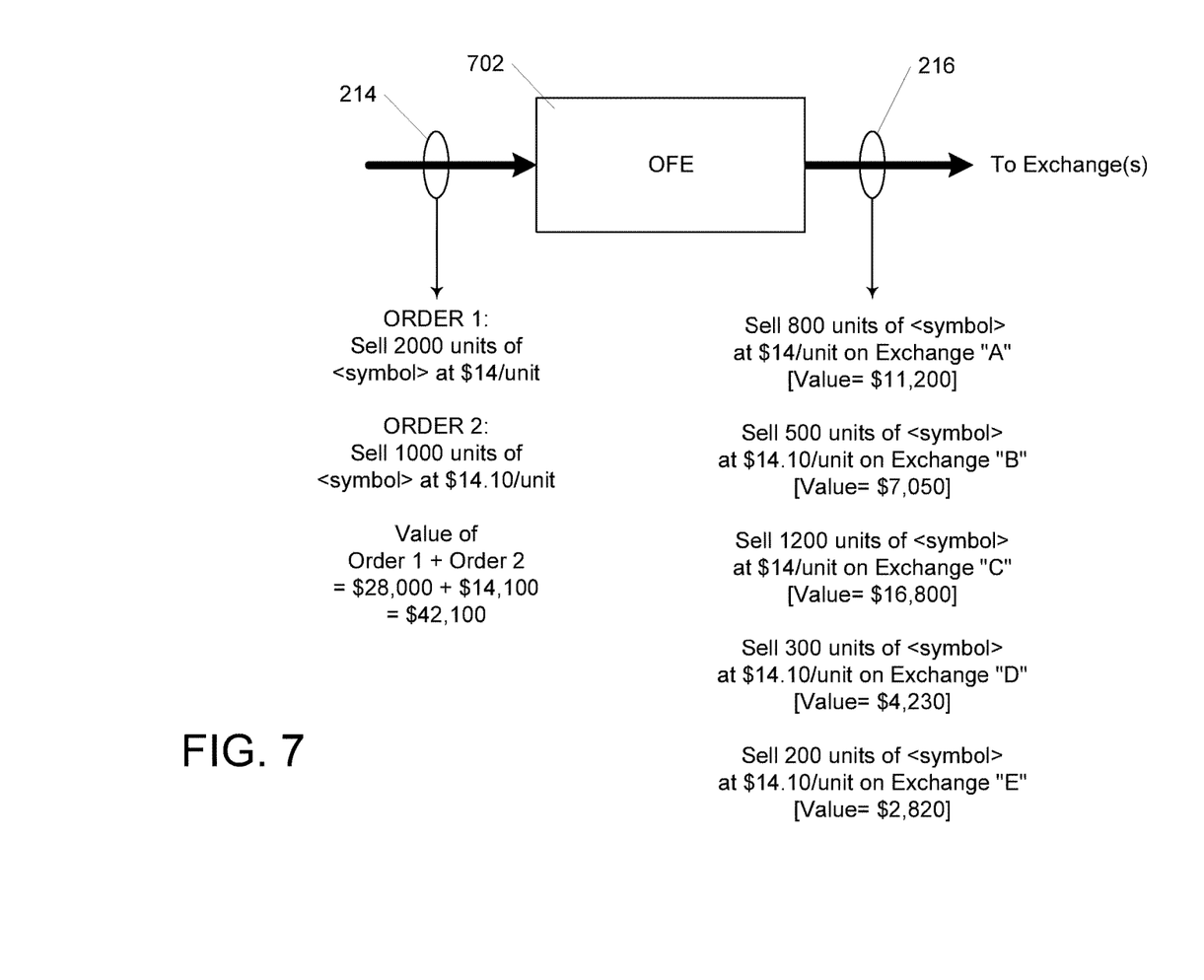
FIG. 7 illustrates, in simplified form, one representative example OFE as defined by two taps.

FIG. 7 illustrates, in simplified form, one representative example OFE 702 as defined by the two taps 214, 216. As shown in FIG. 7, at this level of anomaly detection, order flow for a particular symbol into the OFE 702 is compared with the order flow for that symbol out of the OFE 702 (i.e. on the tap 216 exchange-facing side of the OFE 702) both in terms of number of units and value. On the inflow side, account must be taken for cancel, replace and reject messages. Likewise, on the outflow side, account must be taken for the cancel, replace and reject messages as well as order slicing (if applicable). If there is a discrepancy in either aggregate units or aggregate value, accounting for order cancellations, order replacements, order rejections and order slicing, then it is presumed that this OFE is responsible for the error.

Thus, continuing with the example of FIG. 7 there are two orders for a particular symbol entering the OFE 702, one for a sale of 2000 units at $14.00/unit and another for 1000 units at $14.10/unit. As a result, the total units for that symbol entering that OFE 702 is 3000 units and the total value for that symbol entering that OFE 702 is $42,100. Within the OFE 702, those two orders are split up for direction to five (5) different exchanges for execution. Nevertheless, the total number of units for that symbol that is represented in the flow exiting the OFE 702 is (800 units+500 units+1200 units+300 units+200 units)=3000 units. Since that quantity matches the number of represented units that entered the OFE, the two balance on a quantity basis and no anomaly exists. Likewise, the value of the order flow for that symbol leaving the OFE 702 is ($11,200+$7,050+$16,800+$4230+ $2,820)=$42,100. Since that value matches the value of the order flow into the OFE 702 for that symbol, again, no anomaly exists with respect to order flow for that symbol through that OFE 702.

In contrast, if the order splitting went awry such that some of the units slated for sale at $14.10 were actually incorporated into an order for sale at $14, the value into the OFE would not match the value out and an anomaly would exist.

At this point it is worthy of note that, the flow through an OFE may involve many tens of thousands of transactions per second, for hundreds or thousands of symbols. Thus, the anomaly detection must be equally as fast since it is intended to catch anomalies as they occur. As such, even though this aspect may involve simple arithmetic, it is impossible for the work of the Anomaly Detection & Action Stage 306 to be done by other than extremely fast computers using many processors operating concurrently.

Assuming an anomaly is detected, in some implementations, a four level control hierarchy is used to address the problem so as to avoid or minimize disruption of non-anomalous operation.

Figure 8:
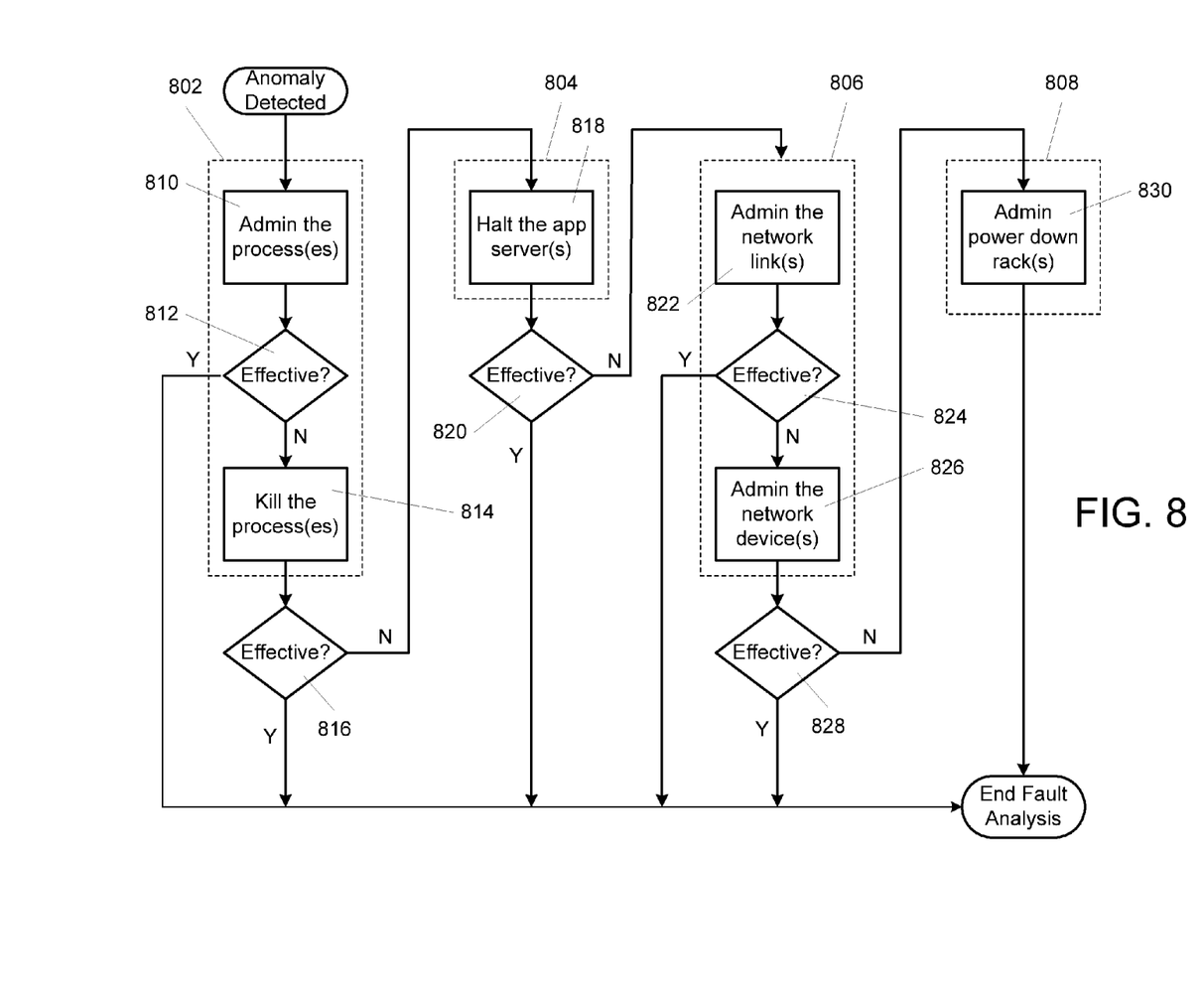
FIG. 8 illustrates, in simplified form, an example four level control hierarchy.

FIG. 8 illustrates, in simplified form, an example of this four level control hierarchy 800. The hierarchy proceeds, in order of increasing potential disruption, from a first level 802 involving process control, to a second level 804 involving server control, to a third level 806 involving network control, to a fourth level 808 involving power control.

The first level 802 involves first administrating the process(es) (Step 810) associated with some or all of that OFE. This involves sending a command to the process(es) to stop trading the symbol(s) for which the anomaly was detected. This step assumes that only the handling of the anomalous symbol by the particular process(es) in this OFE are faulty. If this is effective (Step 812), then trading of the anomalous trading symbol(s) will stop in that OFE (and that symbol trading will be picked up by some other OFE) but all other symbols through that OFE will continue to trade. If not, then a command to kill the process(es)/instance(s) (Step 814) in that OFE involved in trading the symbol(s) for which the anomaly was detected. This step thus assumes that the particular process(es) themselves are faulty. If this is effective (Step 816) then all trading through that process instance will end, and trading of the symbol(s) for which the anomaly was detected will be picked up by other instances. If the "kill the process(es)/instance(s)" (Step 814) is ineffective, then the server control level 804 is invoked.

In the server control level 804, one or more commands are sent to shut down the application server(s) (Step 818) in that OFE involved in trading of the symbol(s) for which the anomaly was detected. If this is effective (Step 820) then all processes running on that application server will stop and the trading normally directed to it will be picked up by other application servers. If this level of control 804 is ineffective, then the approach moves on to the third level 806 of control, network level control.

In the network control level 806, one or more commands are sent to shut down the exchange-facing side network link for server(s) (Step 822) in that OFE involved in trading of the symbol(s) for which the anomaly was detected. If that step is effective (Step 824), then all network communication from those server(s) on the exchange-facing side will end. If not, then one or more commands will be sent to shut down the network switch(es) and/or router(s) necessary to cut off communications from/to that OFE (Step 826). If this is effective (Step 828), then all communications through the OFE (or some subset thereof) will be halted. If this is not effective, then the problem is significant and the fourth level 808 of control is invoked.

The fourth level of control 804 is a power control level. With the power control level 804, power is cut off (Step 830) to the physical rack, bay, frame or cabinet containing the application server(s) and/or network switch(es) and/or router(s). In virtually every instance, this "last resort" should halt the anomaly, albeit in the most disruptive manner.

Other Variants

Depending upon the particular implementation, it should be understood that the linear weighted average could be calculated on an ongoing basis along with the exponential weighted average calculation or it could be calculated, going forward, only when an inflection point is detected. In addition, depending upon the particular implementation, this approach allows for detection of increasing volume anomalies where erroneous orders keep getting sent to the market as well as decreasing volume anomalies where legitimate orders are not being received by a market.

As to the deviation and persistence, optionally as part of its analysis, the Anomaly Detection & Action Stage 306 can advantageously have thresholds set, for example based upon specified percentage deviation alone or one lasting for longer than a specified time, a certain number of standard deviations ("$\sigma$"), an increasing number of standard deviations over time (because the instantaneous deviation could be $\pm 9\sigma$ or more), or some other desired measure, the important point being not the particular measure used, but rather the use of a measure that indicates non-regression towards the norm within the next "x" volume of units traded. In other words, a measure that will allow for the fact that, in some cases, the system 100 may be "ahead" of the market and the market may shortly thereafter follow suit such that the covariance between the two converges, or the system might have a legitimate volume fluctuation caused by an unusual trade but, in such a case, it should quickly turn back towards the norm.

Advantageously, it should be appreciated that the foregoing approach is a new and unique way of identification of anomalies and their handling for that allows for different "levels" of action to be taken so as to quickly address the anomaly while allowing non-anomalous activity to continue to the maximum extent possible for the applicable causing circumstances.

For example, as to detection, the mere detection of an inflection for a given symbol relative to the market, can be set up to trigger an alert of some sort, but not take any other action, whereas detection of several sequential inflections that regress back to the norm may signal an issue not otherwise easily detectable and trigger action according to the control hierarchy or some other action. Likewise, following the detection of an inflection differing degrees of inflection can be used to trigger different actions. For example, higher degrees of inflections may invoke different actions than lesser degrees of inflections. For example, with some implementations a higher degree of inflection across multiple symbols could trigger bypassing of one or more levels of control, for example, resulting in an immediate triggering of the second or third level control action. Similarly, different actions within a level can be triggered based upon persistence/duration of the deviant trend, for example, killing and immediately restarting of the process involved in the errant-trading symbol.

Finally, with our approach in some implementations, the sliding volume window size, degree of inflection, duration or persistence necessary to be considered an anomaly can advantageously be individually specified on a per symbol and/or per exchange-directed basis, in some cases, automatically, and in others, manually with human intervention so as to best avoid normal activity for one symbol being perceived as being anomalous because such would be the case if it happened with another symbol. In this manner, thinly traded or less active symbols can be accounted for differently than heavily traded or more active ones.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A system for the detection of abnormal trading activity directed to any of multiple exchanges and the halting of the detected abnormal trading activity without human intervention, the system comprising:
   multiple network taps, each network tap comprising a low-latency packet flow monitoring switch, a first of the multiple network taps being on an exchange side of order flow element hardware and the second network tap being on a side of the order flow element hardware opposite the exchange side, the first and second network taps each being configured to tap trade order message flow along a path passing through the order flow element hardware toward at least one of the multiple exchanges, the first and second network taps each being used to capture a copy of the trade order message flow;
   at least one pNode, the pNode comprising a low-latency packet flow monitoring switch;
   a computer-implemented anomaly detection and action stage computer comprising:
      a first interface through which market transactional data can be received,
      a second interface through which the copy of the trade order message flow can be received via at least the first and second network taps, and
      non-transient program storage storing programming that implements an anomaly detection engine and is configured to receive trade order flow information from the first and second network taps and analyze the received trade order information relative to market information by
         i) performing an exponential weighted averaging of trade order flow, on a per symbol basis within a sliding volume based window, directed from the trading system to all exchanges to which trades of that symbol can be directed by the trading system while accounting for order cancellations, order replacements, order rejections and order slicing,
         ii) performing a volume based exponential weighted averaging, on a per symbol basis, on trade update messages received during the sliding volume based window,
         iii) on a per symbol basis, checking for covariance between the exponential weighted average of the trade order flow and the exponential weighted average of the trade update messages, and
         iv) comparing trade order messages passing into the order flow element hardware with the trade order messages passing out of the order flow element hardware for consistency in quantity and value; and
      if the anomaly detection engine detects either
         a) anomalous trade order message flow for at least one symbol through the order flow element hardware, or
         b) an inflection point in the covariance indicating a market deviation, for the at least one symbol, that either increases, or persists for, a specified duration of time,
      then the anomaly detection engine will, according to a hierarchical protocol, automatically take a specified action to stop ongoing anomalous trading of the at least one symbol.

2. The system of claim 1, wherein the hierarchical protocol comprises:
   a protocol of at least four levels implemented such that less disruptive action is attempted ahead of more disruptive action.

3. The system of claim 2, wherein the at least four level protocol comprises, in sequence, a process control level, a server control level, a network control level, and a power control level.

4. The system of claim 1 wherein each path from the system to each of the multiple exchanges comprises one or more components of order flow element hardware.

5. The system of claim 1, wherein the detection of the inflection point in the covariance indicating the market deviation is followed by a linear volume weighted averaging in order to determine a rate of deviation.

6. The system of claim 1, wherein the detection of the inflection point in the covariance indicating the market deviation is followed by a linear volume weighted averaging in order to determine deviation persistence beyond the specified duration of time.

7. The system of claim 1, wherein the at least one pNode is connected between the first of the multiple network taps and the anomaly detection and action stage computer.

8. The system of claim 7, further comprising:
   a fill copy receiver coupled to both the at least one pNode and the anomaly detection and action stage computer such that trade order information obtained via the first of the multiple network taps must pass from the pNode through the fill copy receiver before arriving at the anomaly detection and action stage computer.

9. The system of claim 1, further comprising:
   a management and reporting computer coupled to the anomaly detection and action stage computer.

10. A trading system comprising:
    multiple network taps, each comprising a low-latency packet flow monitoring switch coupled to trade flow paths within the trading system so as to capture trade order messages directed to at least one exchange of multiple exchanges for execution without adding latency to the trade order messages;
    at least one pNode comprising a low-latency packet flow monitoring switch;
    multiple components of order flow element (OFE) hardware, each having at least one of the multiple network taps on either side thereof,
    an anomaly detection and action stage computer coupled to the multiple network taps and configured to receive and analyze, on a per symbol basis, trade order information directed within the trading system towards the multiple exchanges based upon covariance between at least an exponential volume weighted average within sliding volume based windows for the trade order information relative to market trading as reported by the multiple exchanges and determine whether an inflection point in the covariance exists for any symbol and, when an inflection point exists for a symbol, determine whether either the covariance deviation rate or covariance deviation duration indicates anomalous trading activity and, if anomalous trading activity is indicated, trigger an automatic action to halt the anomalous trading activity while minimizing disruption of trading for other symbols by the trading system.

11. The trading system of claim 10, wherein the at least one pNode is coupled between at least one of the multiple network taps and the anomaly detection and action stage computer, such that the trade order information passes through the pNode.

12. The trading system of claim 11, further comprising:
a fill copy receiver located between the at least one pNode and the anomaly detection and action stage computer, the fill copy receiver being configured to receive the trade information from the pNode and reformat it for use by the anomaly detection and action stage computer.

13. The trading system of claim 10, wherein the anomaly detection and action stage computer is further configured to determine, on a per symbol basis, that aggregate orders entering each of the multiple components of OFE hardware balance with aggregate orders leaving each of the multiple components of OFE hardware in terms of both unit volume and value.

14. The trading system of claim 10, wherein the trigger of the automatic action to halt the anomalous trading activity invokes a hierarchically arranged trade halting protocol.

15. The trading system of claim 14, wherein the hierarchically arranged trade halting protocol comprises, in order, a process control level of action, which, if ineffective, is followed by a server control level of action, which, if ineffective, is followed by a network control level of action, and which, if ineffective, is followed by a power control level of action.

16. The trading system of claim 15, wherein the process control level of action comprises sending a command to a process to halt trading of a specified symbol.

17. The trading system of claim 16, wherein the server control level of action comprises sending a command to stop all processes running on one or more specified servers.

18. The trading system of claim 16, wherein the network control level of action comprises sending a command to disrupt one or more network connections so as to cut off trading communication by at least one component of OFE hardware that is directed towards all of the exchanges to which that component of OFE hardware can direct trades.

19. A method of automatically detecting anomalous trading activity, directed within a trading system to at least one exchange, the method comprising:
receiving trade order information directed to exchanges for particular symbols at an anomaly detection and action stage computer;
receiving trade update information from the exchanges at the anomaly detection and action stage computer;
using the anomaly detection and action stage computer, analyzing, on an exponential volume weighted average basis within a sliding volume-based window, for each of the particular symbols, covariance between the trade order information and the trade update information in order to identify whether an inflection in the covariance exists for at least one symbol that is indicative of anomalous trading in that symbol, and
when an inflection in the covariance exists, triggering a protocol that will halt the anomalous trading of that symbol.

20. The method of claim 19, wherein the analyzing further comprises, when inflection in the covariance exists for a specific symbol, determining at least one of a degree of the inflection or a persistence of the inflection using a linear weighted average analysis of the specific symbol's trade order information.

* * * * *